Figure 1:
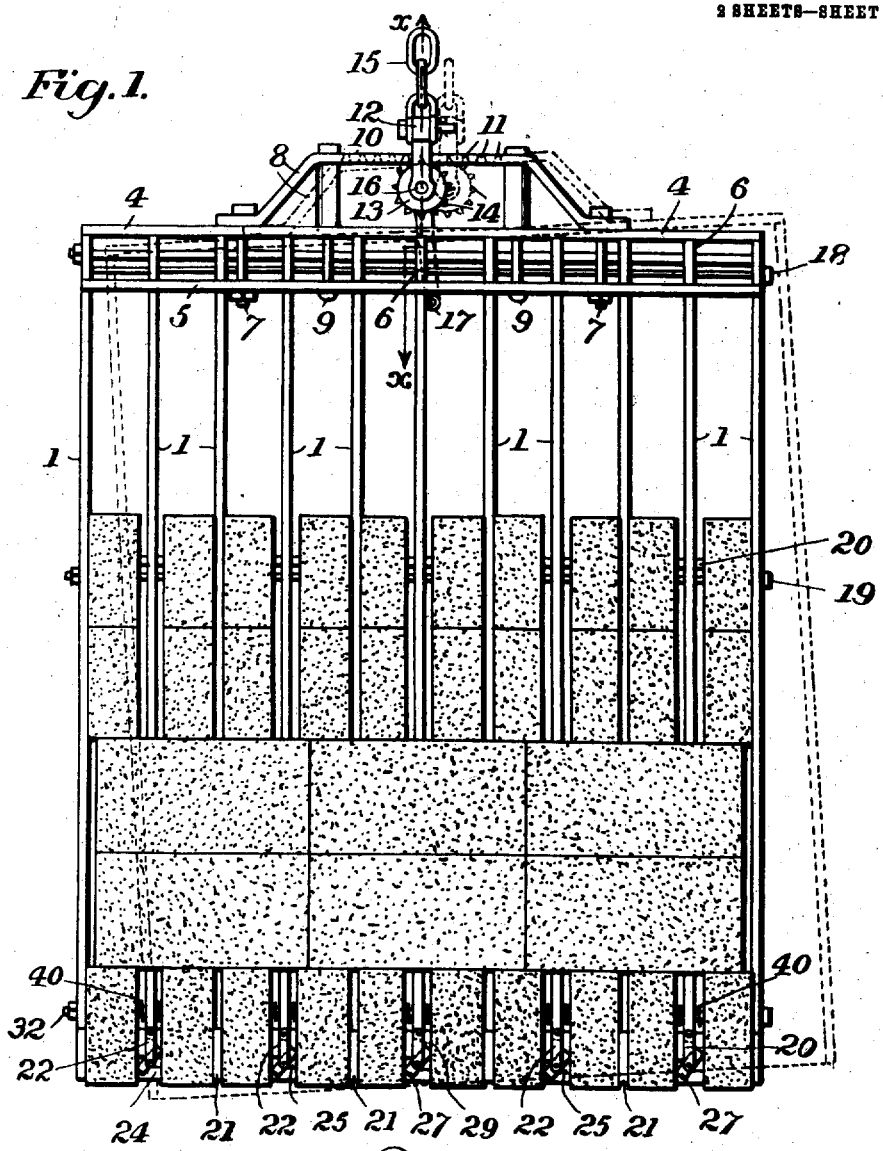

W. H. FRANCIS.

BRICK HANDLING MACHINE.

APPLICATION FILED JUNE 4, 1909.

Reissued Sept. 28, 1909.

13,022.

2 SHEETS—SHEET 1.

Witnesses

J. G. Stinkel

J. J. McCarthy.

Inventor

W. H. Francis by Geo. S. Maxwell,

Attorney

W. H. FRANCIS.

BRICK HANDLING MACHINE.

APPLICATION FILED JUNE 4, 1909.

Reissued Sept. 28, 1909.

13,022.

2 SHEETS—SHEET 2.

Witnesses

J. G. Pinkel

J. J. McCarthy

Inventor

W. H. Francis by Geo. S. Maxwell,

Attorney

UNITED STATES PATENT OFFICE.

WILLIAM H. FRANCIS, OF CHERRYVALE, KANSAS, ASSIGNOR OF ONE-HALF TO CHARLES FRANCIS, OF INDEPENDENCE, KANSAS.

BRICK-HANDLING MACHINE.

13,022. Specification of Reissued Letters Patent. Reissued Sept. 28, 1909.

Original No. 859,445, dated July 9, 1907, Serial No. 347,360. Application for reissue filed June 4, 1909. Serial No. 500,228.

*To all whom it may concern:*

Be it known that I, WILLIAM H. FRANCIS, a citizen of the United States, residing at Cherryvale, in the county of Montgomery and State of Kansas, have invented certain new and useful Improvements in Brick-Handling Machines; and I do hereby declare the following to be a full, clear, and exact description of the invention, such as will enable others skilled in the art to which it appertains to make and use the same.

The object of my invention is to provide a device of this character which is adapted to grip and firmly hold a pile of bricks for conveying them from one place to another and in which the bricks when released from the machine are in their piled relation and can be again gripped by the machine for moving the same. The bricks, as shown, are piled with the lower or bottom row spaced a slight distance apart to receive the clamping jaws of the machine, a pile being defined to mean herein an orderly formation of bricks, which is a series of bricks in width and a series of bricks in height.

My invention resides in providing means to engage and lift the entire pile of bricks without handling, and without disarrangement of the bricks, and wherever placed. By the entire pile, is meant all the bricks, including the bottom-most bricks.

My invention provides lifting means which avoids the necessity of getting beneath the extreme bottom of the pile on the ground, but instead enters within the pile, in the midst of the bricks, so that some of the bricks, the upper portion, are lifted from below, and so that others, the lower portion, are not lifted from below but rather from above their bottoms, thereby avoiding the necessity of getting in under the very bottom. In other words, I carry the entire pile without getting in under the extreme bottom, and my invention consists of means for carrying out this fundamental idea. I foresake entirely the old idea that all the bricks must be supported, *i. e.*, that the carrier must be underneath the bottom layer, and I proceed upon the new conception of gripping or otherwise carrying the bottom in suspension, *i. e.*, without having the carrier actually under or beneath the bottom, and of supporting or carrying the rest of the pile on or above said bottom part thereof. As the lower row or rows of spaced bricks which constitute the bottom support for the rest of the bricks when resting on the ground, on a car, or in a kiln, always (in accordance with my invention) remain with the rest of the bricks as a component part of the pile, being carried along with the rest of the pile but without being engaged underneath, the lifting mechanism is always free to engage or disengage the bricks without disturbing the pile. Hence, my invention includes broadly the provision of lifting mechanism for carrying a pile of bricks so that the lower portion of the pile is suspended (*i. e.*, grasped or held elsewhere and otherwise than underneath the bottom) as distinguished from being supported (*i. e.*, grasped or engaged underneath the bottom). It includes broadly the provision of lifting mechanism for carrying a pile of bricks by supporting the upper portion of the bricks from underneath and suspending, preferably by clamping sidewise, the lower portion of said carried bricks. In its preferred embodiment, my invention provides means for relieving the said lower portion, of the weight, in whole or in part, of the said upper portion of the pile, and hence includes broadly the provision of lifting mechanism capable of carrying a pile of bricks while relieving the lower portion of the pile of the weight of the upper portion of the pile. The lower row or layer of bricks, in the preferred arrangement, constitutes a special bottom, and my invention includes broadly the provision of means for grabbing and taking along intact this bottom with the rest of the pile of bricks, so that the pile is thereby sure of always having its proper and necessary bottom or special form of support on which to rest when deposited anywhere.

Another object of my invention is to provide a machine of this character in which a pile of bricks may be as readily handled when one end of the pile is higher than the other, to prevent the machine from tilting and at all times holding the pile of bricks in horizontal position.

Another object of my invention is to provide a simple, cheap and effective machine to accomplish the above results.

Figure 4:
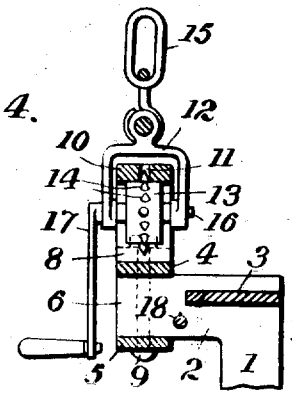
Figure 2:
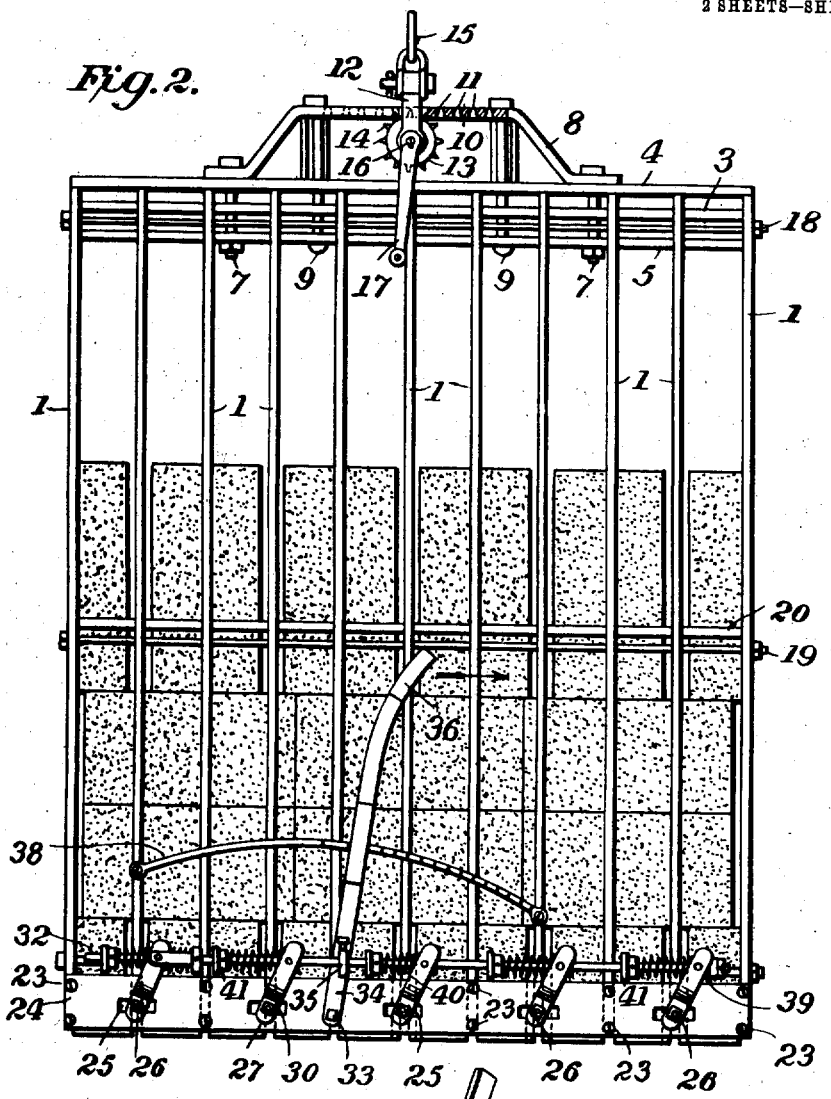
Figure 3:
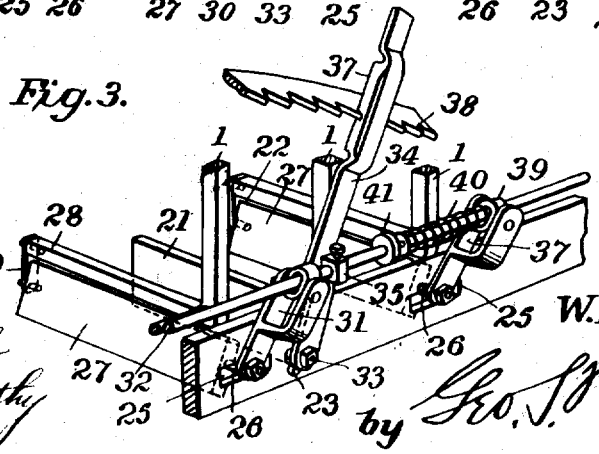

In the accompanying drawings: Figure 1 is an enlarged front elevation of my improved machine showing a pile of bricks supported thereby; Fig. 2 is a rear elevation of Fig. 1; Fig. 3 is a perspective view of the clamping jaw operating mechanism; Fig. 4 is a vertical sectional view taken on the line *x—x* of Fig. 1.

Referring now to the drawings, 1 represents a series of vertically disposed bars provided at their upper ends with laterally turned ends 2. The said laterally turned ends are connected together by a broad transverse bar 3 adjacent their rear edges. The forward end of said laterally turned ends are connected together by bars 4 and 5, one being above and the other below said ends 2, as clearly shown in Fig. 4, and the said bars having their outer edges flush with the outer edge 6 of the lateral end members. Secured to the upper bar 4 at the center, by means of bolts 7, is a yoke 8 for supporting the machine. This yoke, as shown, has additional securing means 9 for forming a more rigid connection with the bar 4. The yoke 8, intermediate the securing means 9, is provided with an elongated horizontal portion 10 having a series of openings 11 extending vertically therethrough. Straddling said yoke transversely thereof is a link 12 which has rotatably mounted in its lower ends a sprocket wheel 13. The said sprocket wheel is located between the upper bar 4 and the horizontal portion 10 of the yoke and is of a diameter less than the space between said bar and yoke, and has its teeth 14 passing into the openings 11 in the horizontal portion 10 of the yoke.

The link 12 has secured to its upper end a supporting chain 15 which may be secured to any desired crane used in brick yards and the like. The shaft 16 of the sprocket wheel, extending outwardly through one side of the link, is provided with a crank 17 for rotating the sprocket wheel. Any desired means is used for holding the crank 17 in its adjusted position, and thus it will be seen that the rotation of the sprocket wheel throws the point of support off of the center of the frame, and a pile of bricks having one end higher than the other can be supported in a horizontal position to prevent the bricks from sliding from the pile.

The bars 1, intermediate their upper and lower ends, and also at the top, are secured together by transverse bolts 18 and 19 and opposite the bolt 19 is an additional bar 20 for further strengthening the frame. The bars 1, as clearly shown in both Figs. 1 and 2, are spaced apart a distance slightly greater than the thickness of a brick, the purpose of which will be hereinafter described. The lower ends of the bars 1 are provided with laterally turned ends 21 which are adapted to pass between the faces of the bricks when they are placed or piled on edge. As clearly shown in Fig. 3, said laterally turned ends are of a length equal to that of the bricks and each alternate laterally turned member 21 has its lower edge cut away at 22. Secured to the inner ends of the laterally turned members 21, by means of screws 23, is a transverse plate 24 which extends entirely across the machine. The said plate 24 opposite each cut away portion 22 of the laterally turned member is provided with an elongated slot 25. Passing through said slot is a pivot 26 of the clamping jaw 27. The said clamping jaws, as shown, are of a width to extend from the cut away portion 22 down to a horizontal line with the lower edge of the member 21. The clamping jaws 27 are of a thickness equal to that of the members 21 and extend out to the outer end thereof. Pivotally connected to the outer end of the member 28 is a link 29 which is also pivoted at its lower end to the clamping jaw 27.

By this construction, it will be seen that the clamping jaws are supported at each end and adapted to oscillate, the purpose of which will be hereinafter more fully described. The outer end of the pivots 26 have rigidly secured thereto an upwardly extending arm 30, which has its upper end bifurcated at 31 to receive the horizontal operating rod 32. Pivotally connected to the plate 24 at 33 is an operating lever 34 which is pivotally connected to the rod 32 at 35 and extends upwardly and is provided with an operating handle 36. The said lever is made of spring metal and is provided intermediate its pivotal connection and handle with a laterally turned portion 37 engaging the segmental rack bar 38 secured to the bars 1.

The bifurcated ends 31 of the arms 30 have pivotally mounted therein the members 39 through which the bar 32 passes and to which said bar is attached. Surrounding the bar 32 are coil springs 40 which bear at one end against the members 39, their opposite ends bearing against stops 41 carried by the bar 32. The tension of the springs 40 holds the arms 30 in the position clearly shown in Fig. 3.

In using my machine, it is understood that the bricks are first made into a pile, the bottom row being placed on edge and a distance apart sufficient to allow the jaws 21 and 27 to pass therebetween. The superimposed bricks may be arranged in any desired manner and to any desired height provided such a height is not greater than the length of the arms 1 of the lifting frame. As herein shown the entire pile is in stacked or spaced formation as required when in the kiln for drying or burning. By moving the lever 34 in the direction indicated by the arrow in Fig. 2, the clamping jaws are turned on their pivots 26 and the bricks on either side of the clamping jaws are firmly gripped against the arms 21, thus firmly supporting the whole pile of bricks. The gripping jaws 27 being linked at 29 and their pivots 26 moving within the slot 25, it will be seen that any variation in the thickness of the bricks on either side of the clamping jaws is overcome and that each brick is firmly gripped. The rod 32, operated by the lever 34, having a spring connection with the arms 30 provides for the variations in the thickness of the bricks and thus all of the clamping jaws 27 are given the same pressure for carrying the lower bricks of the pile in suspension, the rest of the bricks being supported from underneath, while the pile is being carried from one point to another.

From the foregoing description, it will be seen that a pile of bricks can be readily piled and conveyed from one part of a brick yard to the other and released, the same pile being at all times ready to receive the machine and to be again conveyed elsewhere when desired. This result is due to the fact that my machine provides means whereby the spaced bricks of the lower row or rows of the pile of bricks are always carried along as a part of the pile and maintained without disarrangement, and hence, whenever the pile is set down, its bottom arrangement is exactly as required to permit the lifting machine to get in or out without disturbing the pile.

By my invention, the desired spaced bottom is always present with the pile and forms a part of the pile whereas, heretofore it has been necessary either to provide a special receiving table or bottom formed with spaced ribs or receiving portions, or, to lay a special bottom-layer of bricks each time to receive the pile, in order that the lifting means might get in under the pile and get out from under the pile as the case may be. The regularly spaced arrangement of the bottom bricks, and hence of the clamping jaws or devices, is preferred, as is also the lifting of the pile, or at least the bottom bricks thereof, by means which horizontally engages the bottom bricks with a sidewise pressure, but, lest the broad, elemental character of my invention be confused with these preferred features, it will be understood that my invention is commensurate with the broad, fundamental conception of lifting and carrying an intact pile of bricks including the ground layer of said bricks without getting under the extreme bottom of the pile, and my invention covers and includes all mechanism for carrying out this fundamental conception. Means for applying sidewise pressure, by which I mean an engagement of the lower bricks in a horizontal plane, as distinguished from a vertical engagement against the bottoms of the lowermost bricks, is desirable, and certain of my claims are limited thereto, while others of the claims are limited to a vertically disposed lifting frame, etc., but others of the claims are not so limited and are intended to cover the fundamental features of the invention, irrespective of whether the bricks are spaced or not, clamped, grabbed, or otherwise, all or only a portion carried from the lower part, carried from overhead as by a vertical frame or not, etc. Certain of the claims are limited to suspending means for carrying the bricks in suspension, and this is meant to include any and all means of holding or retaining the bricks by engagement therewith at any point or points other than their bottoms. Finally, I wish it understood that my invention includes, broadly stated, means whereby the supported pile of bricks carries its own supporting layer or portion, and while I have herein also claimed the specific mechanism which constitutes the preferred embodiment of the invention, as shown in the drawings, it will be understood that my invention is not limited to any particular mechanism, excepting as required by the claims, and that certain of the latter are intentionally of a broad, foundational character.

The piles of bricks, as heretofore described, need not necessarily be of a uniform height as the machine can be so adjusted as always to be suspended in a horizontal position.

With reference to the method hereindescribed for clamping and lifting the bricks, I do not claim such a method in this application, but have made it the subject matter of a separate application for a patent filed on June 17th, 1907 (Patent 874,582, Dec. 24, 1907).

Having described by invention, what I claim as new and desire to secure by Letters Patent is:

1. A machine of the character described, comprising lifting mechanism for engaging and lifting a pile of superimposed bricks as a body intact and undisturbed as an orderly pile, without individual handling, said pile consisting of a series of bricks in width and a series of bricks in height, said mechanism containing suspending means for carrying the lower bricks of the pile in suspension as distinguished from supported underneath, and including means for applying the pile-carrying strain to the bricks below the top as distinguished from at the top.

2. A machine of the character described, comprising mechanism for lifting from the ground a pile of superimposed bricks, in spaced, stacked formation, as a body intact and undisturbed, said mechanism containing means for applying a lifting engagement to the bottom bricks while still in direct contact with the ground.

3. A machine of the character described, comprising lifting mechanism for engaging and lifting a pile of superimposed bricks as a body intact and undisturbed as an orderly pile, said pile being a series of bricks wide and also high, said mechanism containing suspending means for entering in and among the bricks of the lower layer for carrying said lower layer of the bricks of the pile in suspension as distinguished from supported underneath.

4. A machine of the character described, comprising mechanism for lifting a pile of superimposed bricks from the ground without individual handling, said pile including a series of bricks in width and also in height in orderly piled relation, said mechanism containing means for applying a lifting engagement to the bottom bricks while still in direct contact with the ground, and means to apply the carrying strain to the pile of bricks at a point below the top.

5. A machine of the character described, comprising lifting mechanism for engaging and lifting a pile of superimposed bricks, containing carrying means for engaging and carrying the upper portion of the pile and substantially relieving the lower bricks of the weight of said upper portion, and means for applying the lifting strain to the bricks of the pile below the top of the pile and relieving said top of strain.

6. A machine of the character described, comprising lifting mechanism for engaging and lifting a pile of superimposed bricks, containing supporting means for engaging beneath and carrying the upper bricks of the pile supported thereon, and suspending means for carrying the lower bricks of the pile in suspension as distinguished from supported underneath.

7. A machine of the character described, comprising lifting mechanism containing means for supporting the upper portion of a pile of bricks approximately independently of the lower portion of the pile, and carrying means for applying a lifting sidewise pressure to and among the bricks of said lower portion of the pile.

8. A machine of the character described, comprising lifting mechanism containing means for supporting the upper portion of a pile of bricks approximately independently of the lower portion of the pile, and carrying means for applying a lifting sidewise pressure to and among the bricks of said lower portion of the pile.

9. A machine of the character described, comprising a frame for lifting a pile of superimposed bricks, provided with laterally extending clamping means for applying a pinching lifting strain to the lower part of the pile.

10. A machine of the character described, comprising a frame having provision for lifting a pile of superimposed bricks, including a plurality of laterally extending clamping devices spaced apart to receive between them the lower bricks of the pile in supported engagement therewith.

11. A machine of the character described, comprising lifting means adapted to lift a pile of superimposed bricks, provided with laterally extending members spaced apart to enter between the lower bricks of the pile, and means for clamping said lower bricks to be carried in suspended position.

12. A machine of the character described, comprising lifting means adapted to lift a pile of superimposed bricks, having laterally extending supporting and clamping mechanism spaced apart to enter between the lower bricks of the pile for supporting the upper portion of the bricks and suspending the lower portion of the bricks while the pile is being secured.

13. A machine of the character described, comprising a vertically disposed frame, laterally extending arms carried by the upper end of said frame, supporting means carried by the outer end of said arms, and laterally extending clamping jaws carried by the lower end of said frame.

14. A machine of the character described, comprising a vertically disposed frame, laterally extending arms carried by the upper end of said frame, supporting means longitudinally adjustably carried by the outer end of said arms and laterally extending clamping jaws carried by the lower end of said frame.

15. A machine of the character described, comprising a vertically disposed frame, laterally extending arms carried by the upper end of said frame, an elongated yoke carried by the outer end of said arms, a link suitably supported and straddling said yoke, a sprocket wheel rotatably carried by the lower end of said link and having teeth entering openings in the yoke, means for rotating said sprocket wheel whereby the point of support is shifted, and laterally extending gripping jaws carried by the lower end of said frame.

16. A machine of the character described, comprising a vertically disposed frame shaped and adapted to receive and carry a pile of bricks, said pile consisting of a series of bricks wide and high, laterally extending arms carried by the lower end of said frame in position to enter side by side between the bricks, and gripping jaws pivotally supported below said laterally extending arms adapted to grip the bricks between them.

17. A machine of the character described, comprising a vertically disposed frame shaped and adapted to receive and carry a pile of bricks, said pile being a series of bricks wide and high, laterally extending arms carried by the lower end of said frame adapted to enter among the bricks without disturbing the piled formation, gripping jaws pivotally supported below said laterally extending arms in position to grip the bricks of the adjacent widthwise series, and means for simultaneously operating said gripping jaws.

18. A machine of the character described, comprising a vertically disposed frame, laterally extending arms carried by the lower end of said frame, gripping jaws linked to the outer end of said arms and having their inner ends journaled in elongated horizontal slots, operating arms carried by the journals of said gripping jaws, an operating lever, and a spring connection between said lever and operating arms.

19. A machine of the character described, comprising a vertically disposed frame, laterally extending arms carried thereby, each alternate arm having its lower edge cut away, a link carried by the outer end of the cut away arm, gripping jaws pivotally connected to the lower ends of said links, pivots carried by the inner ends of said gripping jaws and passing through horizontal elongated slots, arms rigidly secured to said pivots and having bifurcated upper ends, a horizontally arranged rod passing through said bifurcated arms, stops carried by said rod, coil springs on the rods between the stops and the bifurcated ends of the arms, and a pivoted operating lever connected to said rod whereby the gripping jaws are simultaneously moved and given the same gripping pressure.

In testimony whereof I have affixed my signature, in presence of two witnesses.

WILLIAM H. FRANCIS.

Witnesses:
M. A. FINLEY,
CHAS. A. MITCHELL.